United States Patent [19]
White, Jr. et al.

[11] 3,767,069
[45] Oct. 23, 1973

[54] TRAILER LIFTING DEVICE

[75] Inventors: James C. White, Jr., Lloyd A. Molby, both of Longview, Tex.

[73] Assignee: Capacity, Inc., Downers Grove, Ill.

[22] Filed: Jan. 12, 1972

[21] Appl. No.: 217,333

[52] U.S. Cl............. 214/86 A, 280/402, 254/139.1
[51] Int. Cl............................................... B60p 3/00
[58] Field of Search...................... 214/86 A, 130 R; 280/402; 254/139.1

[56] References Cited
UNITED STATES PATENTS

| | | | |
|---|---|---|---|
| 2,481,223 | 9/1949 | Johnson | 214/86 A |
| 2,593,764 | 4/1952 | Kaunitz, Jr. | 214/86 A X |
| 3,599,812 | 8/1971 | Hasstedt | 214/86 A |
| 3,207,338 | 9/1965 | Felburn | 214/131 R |
| 2,604,302 | 7/1952 | Francis | 214/86 A |

Primary Examiner—Albert J. Makay
Attorney—Hofgren, Wegner, Allen, Stellman & McCord

[57] ABSTRACT

A trailer lifting device for use with spotting tractors having motor driven, vertically adjustable fifth wheels for changing the orientation of the fifth wheel on the spotting tractor. The lifting device includes an upright member terminating in a base provided with a connection element for receipt in the fifth wheel of the spotting tractor with which it is used. A flexible attaching element is connected to the upright and is provided with a connector for securing the attaching element to a trailer whereby the one end of the trailer may be raised to changing the vertical position of the fifth wheel on the spotting tractor.

3 Claims, 4 Drawing Figures

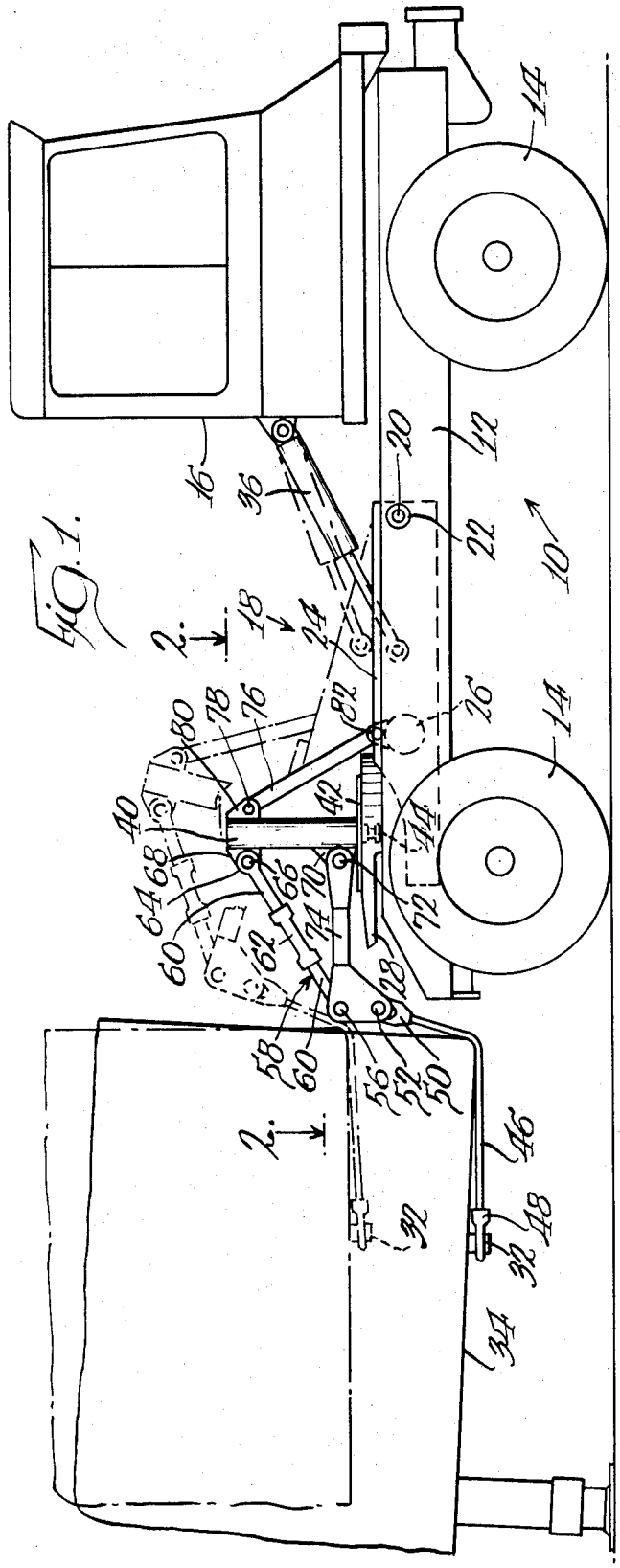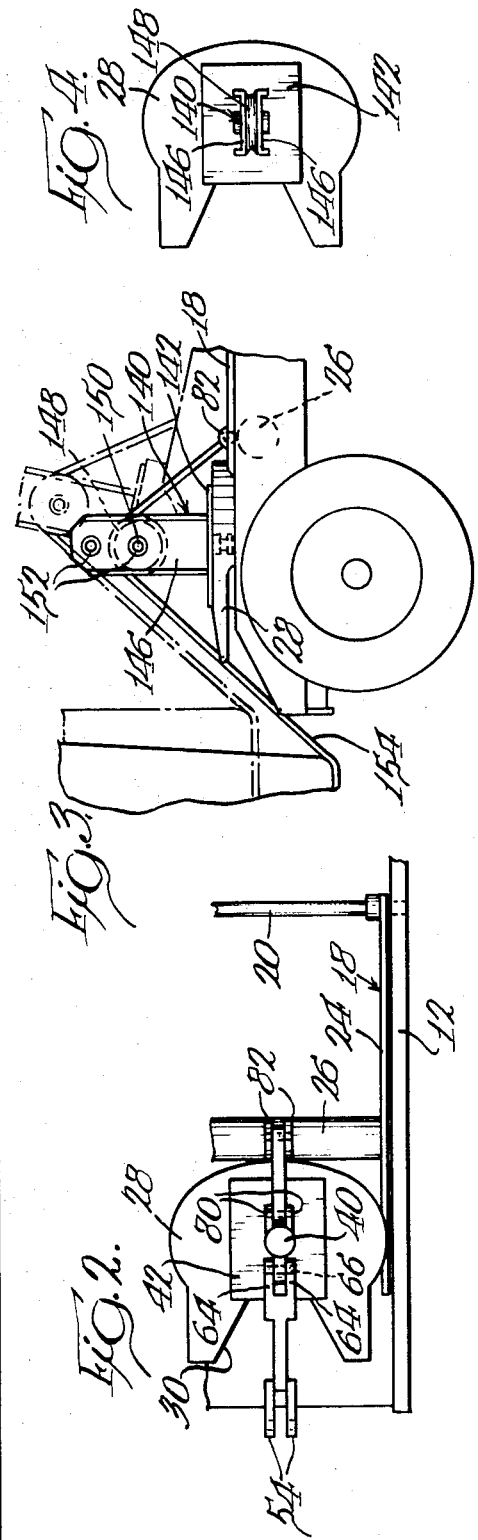

TRAILER LIFTING DEVICE

BACKGROUND OF THE INVENTION

This invention relates to trailer lifting devices, and more particularly, to trailer lifting devices that take advantage of equipment customarily employed on spotting tractors.

For years, operators of trucking terminals have employed so-called "spotting tractors" to increase the operational efficiency in shifting trailers from one location to another in a trucking terminal as needs may require. For example, spotting tractors may be used to move trailers into and out of a storage area or from one loading dock area to another.

Such spotting tractors differ from the ordinary tractor in that the fifth wheel thereof is mounted on a subframe which in turn is pivotally mounted to the vehicle frame and means, normally in the form of a hydraulic cylinder, are employed to vary the vertical attitude of the subframe with respect to the vehicle frame to the extent that the vertical position of the fifth wheel may be varied a distance on the order of 16 inches or more. Such structure enables a spotting tractor, with its fifth wheel in a lowermost position, to ease under a trailer resting on its dolly wheels to capture the trailer pin in the fifth wheel whereupon, after suitable brake connections are established, the fifth wheel may be elevated to lift the trailer off of its dolly wheels so that it may be easily towed and respotted at some other location.

While the use of such spotting tractors has increased the efficiency of terminal operations, not infrequently, difficulties are encountered even with the use of a spotting tractor. For example, if the dolly wheel structure of the trailer is damaged, it is possible that the corresponding end of the trailer will be too low to enable the spotting tractor to slip the fifth wheel under the trailer even when the fifth wheel is in its lowermost position. Similarly, many terminal operations include unpaved storage areas and if the ground of the storage areas is soft, a trailer moved to that area may have its dolly wheels sink in the soft ground to the point where the corresponding end of the trailer is too low to be picked up by the spotting tractor.

Such difficulties have heretofore been solved in a time-consuming and uneconomical manner. When they are encountered, it has been the practice to send out a crew of laborers to the trailer with equipment in the form of jacks and timbers. The trailer is then jacked up to a sufficient height so that the spotting tractor may slip its fifth wheel thereunder and shimmed in the elevated position with the timbers until the spotting tractor makes a connection with the trailer. The manpower requirements as well as the need for jacks renders such an operation extremely uneconomical.

SUMMARY OF THE INVENTION

The principal object of the invention is to provide a lifting device for attachment to spotting tractors that will facilitate the pickup of trailers by the spotting tractor which, for any reason, are too low to be picked up in the normal manner.

More specifically, it is an object of the invention to provide such a lifting device that takes advantage of conventional equipment on the spotting tractor to eliminate the need for other mechanical equipment such as the jacks heretofore used and to minimize the amount of labor required for such operations.

The invention achieves the foregoing objects by means of an upright having a base which in turn is provided with a pin for releasable receipt in the fifth wheel of the spotting tractor. Connected to the upright is a flexible attaching element which terminates in an element for connection to the pin of the trailer. Thus, with the fifth wheel of the spotting tractor in its lowermost position, a connection may be established and thereafter, by raising the fifth wheel with a conventional hydraulic cylinder, the trailer will be lifted and may be shimmed in its elevated position so that connection to the spotting tractor may be established after removal of the lifting device.

Preferably, means are additionally provided for effectively varying the length of the flexible connecting element. According to one embodiment, the length may be varied by the use of a rigid, extensible member while according to another, a flexible element engaging device on the upright is provided and may be adjustably positioned on the upright.

Other objects and advantages will become apparent from the following specification taken in conjunction with the accompanying drawings.

DESCRIPTION OF THE DRAWINGS

FIG. 1 is a side elevation of a spotting tractor employing a lifting device made according to the invention;

FIG. 2 is a sectional view taken approximately along the line 2—2 of FIG. 2;

FIG. 3 is a fragmentary side elevation of a modified embodiment of the lifting device; and FIG. 4 is a partial plan view of the modified embodiment.

DESCRIPTION OF THE PREFERRED EMBODIMENTS

One embodiment of a trailer lifting device made according to the invention is illustrated in FIGS. 1 and 2 mounted on a spotting tractor, generally designated 10. The spotting tractor 10 includes a main frame 12 journaling wheels 14 and mounting a cab 16 which may house a suitable power unit.

The frame 12 pivotally mounts a subframe, generally designated 18, which is comprised of a pivot bar 20 journaled in the sides of the frame 12 as at 22, side members 24 (only one of which is shown) and a cross member 26. The subframe 18, by means not shown, also mounts a conventional fifth wheel 28 which, as is well-known, includes a trailing, lead-in slot 30 for receipt of a pin 32 depending from the underside of the front end of a conventional trailer 34. Additionally, the fifth wheel 28 includes means not shown of a conventional nature for releasably receiving the pin 32.

Finally, a hydraulic cylinder, shown schematically at 36, is interconnected in any suitable manner between the vehicle frame 12 and the subframe 18 so as to cause the latter to pivot about the axis provided by pivot bar 20.

The lift device is comprised of an upright member 40 having secured thereto, at its lower end, a base 42 in the form of a plate. Extending below the base and secured to the same, either as a separate element or a downward extension of the upright 40 projecting through the base 42, is a connecting pin 44 which may be configured generally along the lines of the trailer pin 32 for releasable receipt in the locking mechanism of the fifth wheel 28.

A flexible attaching element in the form of a cable 46 mounts at one end a cast iron eyelet 48 or the like which may be connected to the pin 32 on the trailer 34 and has its other end secured to the upright 40. In the embodiment illustrated in FIGS. 1 and 2, the end of the cable 46 opposite the eye 48 terminates in a second eye 50 which is impaled by a pin 52 extending between a bracket defined by parallel, spaced plates 54. The plates 54 additionally mount a pivot pin 56 which pivotally receives a relatively rigid, elongated, extensible member, generally designated 58. According to one form of the invention, the extensible member 58 may be formed of a pair of rod sections 60 interconnected by a conventional turnbuckle-like structure 62.

The rightmost one of the rods 60 as viewed in FIG. 1 terminates in a yoke defined by spaced eyelets 64 which receive a pivot pin 66. A lug 68 secured to the upper end of the upright 40 also pivotally receives the pin 66 to thereby establish a connection between the cable 46 and the upright 40 which includes means for effectively varying the length of the cable 46 by reason of the presence of the turnbuckle 62.

The upright 40, at a point intermediate the base 42 and th point of connection of the extensible element 58, includes an outwardly projecting lug 70 which pivotally mounts by means of a pivot pin 72, a bracing element 74. The brace 74 extends to the plates 54 and is secured thereto to establish a pivotal connection between the brace 74 and the extensible element 58.

The lifting device structure illustrated in FIG. 1 is completed by a second brace 76 having one end pinned as at 78 to the upper end of the upright 40, and specifically, forwardly projecting ears 80 thereon. The other end of the brace 76 is similarly pinned to outwardly projecting ears 82 on the cross member 26.

The operation of the device will be understood from FIG. 1. Specifically, the eye 48 is connected to the trailer pin 32 when the fifth wheel 28 is in its lowermost position. The turnbuckle 62 may be adjusted to take up any slack in the linkage and thereafter, the cylinder 36 may be energized to pivot the subframe 18 from the solid line position to the dotted line position which will result in the lifting of the trailer 34 to an elevated position. At this time, through the use of timbers, the trailer 34 may be shimmed in its elevated position and when the shimming operation is completed, the cylinder 36 may be energized in the opposite direction to release the tension in the cable 46 so that the lifting device may be removed whereupon the spotting tractor may be backed under the forward end of the trailer 34 to establish a connection between the trailer pin 32 and the fifth wheel 28 in the conventional manner. Of course, if the trailer 34 is so low that the range of movement provided is insufficient to raise the trailer to a sufficient height in one operation, the foregoing operation may be repeated as many times as necessary until such time as the trailer is appropriately raised.

A second embodiment of the invention is illustrated in FIGS. 3 and 4 and is seen to include an upright, generally designated 140, mounted on a base 142 also provided with a connection pin 144 for releasable receipt in the locking mechanism of the fifth wheel 28. According to the embodiment illustrated in FIGS. 3 and 4, the upright 140 is formed by two outwardly open channel sections 146 that are spaced apart a distance sufficient to receive a rotatable sheave therebetween. The sheave 148 is journaled to the upright 140 by means of a shaft 150 received in aligned apertures 152 in the channels 146. As illustrated in FIG. 3, a plurality of such apertures 152 are provided along the vertical length of the upright 140 so that the vertical position of the sheave 148 on the upright 140 may be varied to effectively vary the length of a flexible connecting element.

More specifically, a flexible connecting element in the form of a cable 154 is provided and the same includes, at one end, an eye (not shown) similar to the eye 48 for connection to a trailer pin 32. The other end of the cable 154 is connected in any suitable fashion to the upstanding ears 82 on the cross member 26 of the subframe 18 and an intermediate portion of the cable 154 passes over the sheave 148.

The operation of the embodiment illustrated in FIG. 3 is accomplished similarly to that illustrated in FIG. 1 with the exception that slack in the flexible connecting element in the form of the cable 154 is taken up by appropriately varying the vertical position of the sheave 148 on the upright 140.

From the foregoing, it will be appreciated that a trailer lifting device made according to the invention readily accomplishes its objects in terms of eliminating any need for jacks by making use of an already-present mechanism, namely, the hydraulic cylinder 36 on the spotting tractor. And it will be readily appreciated that labor costs incurred in lifting a trailer sufficiently so that it can be linked up with the spotting tractor are minimized for, if need be, the entire lifting operation can be performed by a single person. Thus, use of a trailer lifting device according to the invention minimizes equipment costs and labor expenses.

We claim:

1. For use with a spotting tractor having a wheeled frame, a fifth wheel for connection to a trailer movably mounted on the frame, and a selectively operable motor for changing the vertical position of the fifth wheel on the frame, a trailer lifting device comprising:
  a. an upright member;
  b. a base on the lower end of said upright member;
  c. means on said base for receipt by a fifth wheel for releasable connection thereto;
  d. a flexible attaching element connected to said upright above said base;
  e. trailer connecting means on the end of said flexible attaching element remote from said upright for releasable connection to a trailer;
  f. means for effectively varying the length of said flexible attaching element including an elongated, relatively rigid, extensible member interconnecting said flexible element and said upright;
  g. means pivotally securing one end of said extensible member to said upright;
  h. a brace of fixed length;
  i. means pivotally connecting one end of said brace to the other end of said extensible member; and
  j. means pivotally connecting the other end of said brace to said upright between said base and the point of connection of said extensible member thereto;
  k. whereby when said lifting device is secured to a spotting tractor fifth wheel, one end of a trailer may be selectively elevated for subsequent connection to a tractor by securing said trailer connecting means to the trailer and operating the motor to elevate the fifth wheel and thus the trailer.

2. The lifting device of claim 1 wherein said extensible member comprises a turnbuckle.

3. The lifting device of claim 1 in combination with a spotting tractor having said wheeled frame, said fifth wheel thereon and said motor for changing the vertical position of said fifth wheel thereon, said spotting tractor further including a subframe pivotally secured to said frame and mounting said fifth wheel; and bracing means extending from said upright to said subframe.

* * * * *